United States Patent [19]
Kocznar

[11] Patent Number: 5,914,482
[45] Date of Patent: Jun. 22, 1999

[54] APPARATUS FOR READING AND IDENTIFYING A DATA CARRIER IN CARD FORM WHICH HAS PRINTING THEREON

[75] Inventor: Wolfram Kocznar, Innsbruck, Austria

[73] Assignee: Skidata Computer GmbH, Gartneau, Australia

[21] Appl. No.: 08/809,918

[22] PCT Filed: Oct. 10, 1995

[86] PCT No.: PCT/AT95/00196

§ 371 Date: Apr. 4, 1997

§ 102(e) Date: Apr. 4, 1997

[87] PCT Pub. No.: WO96/11451

PCT Pub. Date: Apr. 18, 1996

[30] Foreign Application Priority Data

Oct. 10, 1994 [AT] Austria ..................................... 1906/94

[51] Int. Cl.⁶ .................................................. G06K 19/00
[52] U.S. Cl. ............................................ 235/487; 235/493
[58] Field of Search ..................................... 235/487, 493; 283/77

[56] References Cited

U.S. PATENT DOCUMENTS

| | | | |
|---|---|---|---|
| 4,330,350 | 5/1982 | Andrews | 156/152 |
| 4,692,394 | 9/1987 | Drexler | 283/77 |
| 4,904,853 | 2/1990 | Yokokawa | 235/487 |

FOREIGN PATENT DOCUMENTS

| | | |
|---|---|---|
| 0174902 | 3/1986 | European Pat. Off. . |
| 0199234 | 10/1986 | European Pat. Off. . |
| 0344789 | 12/1989 | European Pat. Off. . |
| 0506085 | 9/1992 | European Pat. Off. . |
| 0523888 | 1/1993 | European Pat. Off. . |
| 0535930 | 4/1993 | European Pat. Off. . |
| 0560986 | 9/1993 | European Pat. Off. . |
| 0589368 | 3/1994 | European Pat. Off. . |
| 9221105 | 11/1992 | WIPO . |
| 9611451 | 4/1996 | WIPO . |

OTHER PUBLICATIONS

Patent Abstracts of Japan vol. 14 No. 478 (M–1036)JP2192999 Jul. 1990.

*Primary Examiner*—Harold Pitts
*Attorney, Agent, or Firm*—Lorusso & Loud

[57] ABSTRACT

The invention concerns a card-shaped data carrier comprising a card body which has an inner electronic module for contactless communication with a coding and/or reading device and an external heat sensitive layer for the visually readable display of data stored in the electronic module as a result of thermal impact. The heat sensitive layer is designed to be reversible such that marks can be inscribed in a first temperature range and existing marks can be deleted in a second temperature range. The heat-sensitive layer is disposed on the card body in at least one sub-area thereof.

4 Claims, 2 Drawing Sheets

APPARATUS FOR READING AND IDENTIFYING A DATA CARRIER IN CARD FORM WHICH HAS PRINTING THEREON

FIELD OF THE INVENTION

The invention concerns an apparatus for reading and identifying a data carrier in card form, which can have printing thereon, in particular a travel ticket or card, a ski pass or the like, which is provided at least one side with a heat-sensitive layer for the visually readable representation of data by a thermal effect, with atransport mechanism for moving the data carrier in a flat passage which determines the transport path, a device having a thermal print head for visually readably identifying the data carrier, and a backing roller disposed opposite the thermal print head. The invention also concerns a data carrier for use with such an apparatus.

BACKGROUND OF THE INVENTION

A data carrier which includes an electrical module and which can be used over a prolonged period of time is to be found for example in WO-A-92/21105, wherein parts which are essential for the user, of the data contained in the electronic module can be represented in the heat-sensitive coating on the card body and can no longer be removed. Heat-reversible coatings and data carriers in card form which include same are known for example from EP-A-174 902 or EP-A-344 789. In that case the erasing temperature range is generally between 50° and 100° C. and the writing operation is effected at temperatures above 110° C. Writing on the heat-sensitive coating can thus be erased and re-applied.

An apparatus of the kind set forth in the opening part of this specification is known for example from EP-B-199 234. The thermal print head is rigidly arranged on the transport path and the oppositely disposed backing roller is resiliently movably suspended. For reversible processing of a thermal coating, above-mentioned EP-A-174 902 and EP-A-344 789 each diagrammatically show apparatuses in which the single thermal print head is heated to the respectively required writing or erasing temperature. In that respect the thermal print head was intended to perform two different functions: for erasing written characters, it is desirable if the entire surface to be processed is set to the erasing temperature, as uniformly as possible. In contrast, the writing operation is possible only by virtue of heating of the heat-sensitive coating being effected in an only locally delimited manner, namely within the contours of the characters to be reproduced.

SUMMARY OF THE INVENTION

In accordance with the invention therefore, for the reversible processing of data carriers with a heat-sensitive coating, it is provided that the thermal print head has a writing head which is operative in the first temperature range for writing the heat-sensitive layer and an erasing head which is operative in the second temperature range for erasing existing characters.

The two heads are preferably arranged in side-by-side relationship on a common carrier in such a way that the data carrier passes firstly the erasing head and then the writing head. Thus old characters can be erased and new characters can be written in one processing operation, the writing times being reduced by virtue of the pre-heating effect in the erasing operation.

The erasing head can also be used only for simply pre-heating the heat-sensitive coating, without characters being erased.

In the printing operation using the effect of heat, the data carrier should be slightly curved at least in the printing region so that the thermal print head bears approximately tangentially against the print region. In order to reduce the susceptibility to trouble, the thermal print head should come into contact with the data carrier only when it is actually used. As data carriers which not only have a zone which can be printed upon by the effect of heat but additionally also include a magnetic strip and/or an electronic module are possibly of greater thickness and involve an increased level of flexural stiffness, in a further preferred embodiment of the apparatus the curvature of the data carrier is produced by virtue of the backing roller being arranged movably towards the thermal print head, wherein the thermal print head is disposed in an outward bulge portion of the passage, so far outside the transport path that only passing data carriers do not touch the thermal print head.

The data carriers to be processed are therefore generally moved along a flat transport path. If the data carrier is to be processed by means of the thermal print head, the backing roller is actuated to flex the data carrier by applying pressure thereto so that the data carrier is of the curved configuration corresponding to the outward bulge portion of the passage. The fact that a data carrier is not touched, due to the specified distance, when the data carrier is (just now) not to be printed upon, avoids unnecessary contamination and wear of the two heads which, as the backing roller is moved in any case, are preferably arranged on a carrier which is fixed in the outward bulge portion.

A further preferred construction provides that the read-identification device comprises a bar code reader, a magnetic strip reader and/or an IC reader, wherein the thermal print head and the outward bulge portion of the passage are disposed between the bar code reader and the magnetic strip reader so that data carriers with a bar code, with a magnetic strip and/or with an electronic module (IC) can be read by machine and if necessary subjected to thermal treatment if for example the storage content or changes therein are to be made visually readable or a bar code is to be applied. A data carrier which is only to be checked passes freely through in the flat transport path.

In the case of a data carrier in card form which, in accordance with above-mentioned WO-A-92/21105, has an in particular multi-layer card body in which there is arranged an electronic module for in particular contact-less communication with an encoding and/or reading apparatus, and a heat-sensitive layer, and the data of which are provided in a non-volatile, re-writable memory of the electronic module, for the purposes of use with the apparatus according to the invention the heat-sensitive layer is designed both for writing with characters in a first temperature range and also for erasing existing characters in a second temperature range and is arranged on the card body at at least a portion thereof.

If a part of the data on the heat-sensitive layer is not to be over-writable but is to be maintained invariably, for example in the case of personal data of the owner, then provided for such data in a further second portion is a heat-sensitive layer which is not re-writable. For example the name of the owner can be entered in the second portion by thermal action, in which case any further thermal action destroys the layer.

A preferred construction provides that the heat-sensitive layer which is not re-writable is provided on a thermotransfer foil. In order to be able to re-use data carriers which are no longer required, in spite of the irreversible layer which in particular is written with owner-related data, and in order to be able to issue such a data carrier to a new owner, a further construction provides that the second portion is provided on a transparent adhesive foil which is detachably connected to the card body and which is for example a self-adhesive foil. The adhesive foil is preferably stuck on to the card body only along an edge strip, wherein the remaining region of the adhesive coating is covered by a protective paper which can be pulled off.

The heat-sensitive layer which is not re-writable may be provided for example only in a portion of the adhesive foil and a further third portion may be printed with printing ink. The heat-sensitive layer which is not re-writable is provided in particular in the region which is covered by the protective paper that can be pulled off, so that the folded-back adhesive foil which is attached to the card body, together with protective paper, can be inserted into the thermal printer. If a thermotransfer foil is used for that writing operation, in particular the thermotransfer foil is provided at the inside of the adhesive foil. In that respect it is particularly advantageous if the carrier of the thermotransfer foil, which carrier is to be removed, at the same time forms the protective paper for the adhesive coating on the transparent adhesive foil.

A further fourth portion can be provided for the picture of the owner. Here, a first option provides that a photograph can be inserted between the transparent adhesive foil and the card body. It is also advantageous in regard to arranging the photograph if the adhesive foil is fixed to the card body only along the edge strip and the photograph is glued fast in position after removal of the protective paper, by the adhesive foil.

In order to provide a flat outside surface, the card body preferably has a recess into which the photograph can be laid, the recess preferably being freed to receive the photograph by the removal of an insert which is inserted in manufacture. The flat outside surface is therefore present even when no photograph is inserted. The insert comprises for example a siliconised paper of a thickness of a normal photographic paper.

A second option provides that the portion for the picture of the owner also has a non-reversible heat-sensitive coating. This makes it possible for the picture of the owner to be simultaneously printed upon with other personal data. If the card body has the removable insert, it can therefore either be provided with the photograph which is fitted into the recess instead of the insert, or provided with the picture by the effect of heat on the non-reversible heat-sensitive coating.

BRIEF DESCRIPTION OF THE DRAWING

The invention will now be described in greater detail hereinafter with reference to the Figures of the accompanying drawing, without being restricted thereto.

In the drawing.

DETAILED DESCRIPTION OF THE PREFERRED EMBODIMENT

Figure 1:
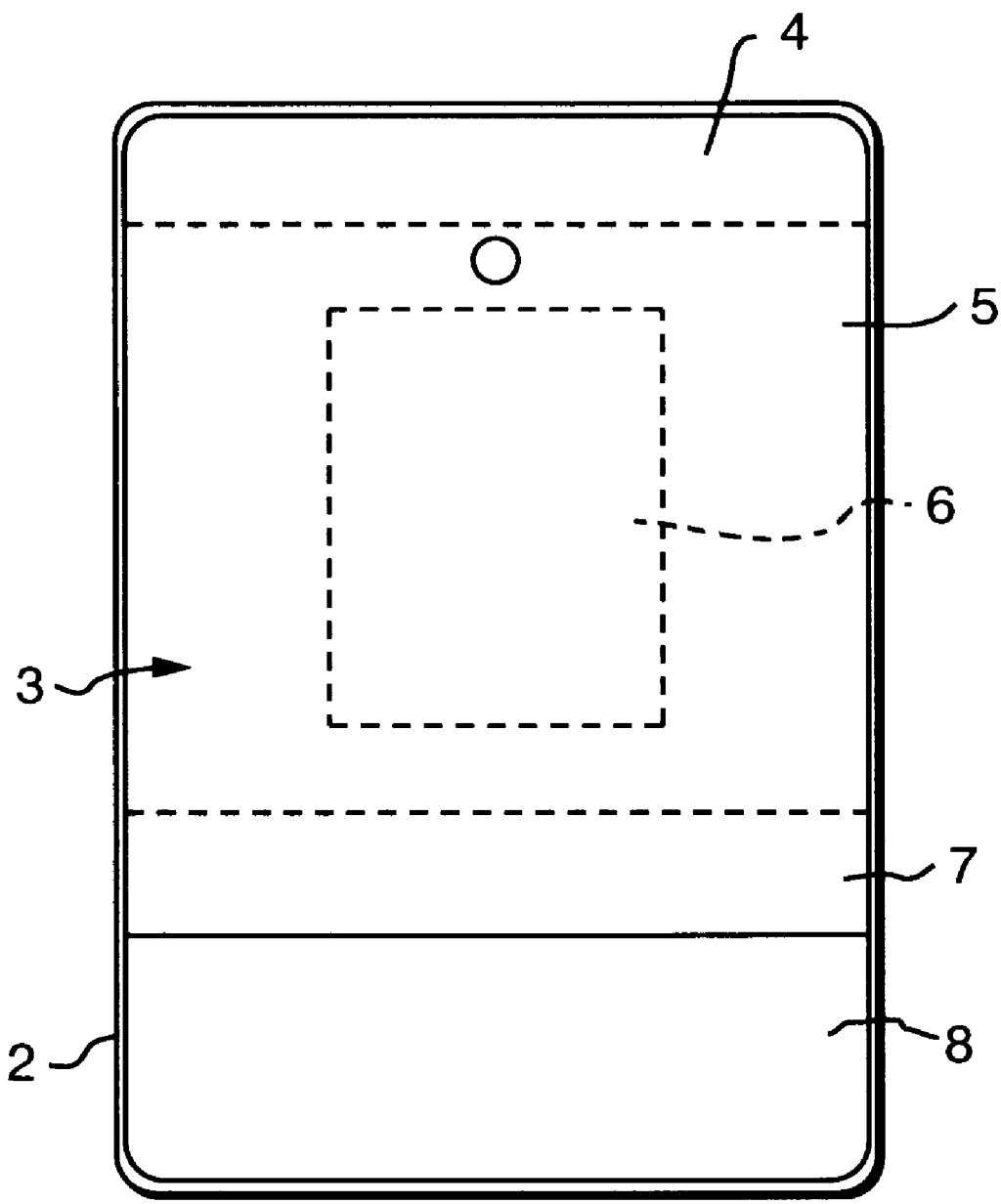
FIG. 1 is a plan view of a data carrier according to the invention.
Figure 2:
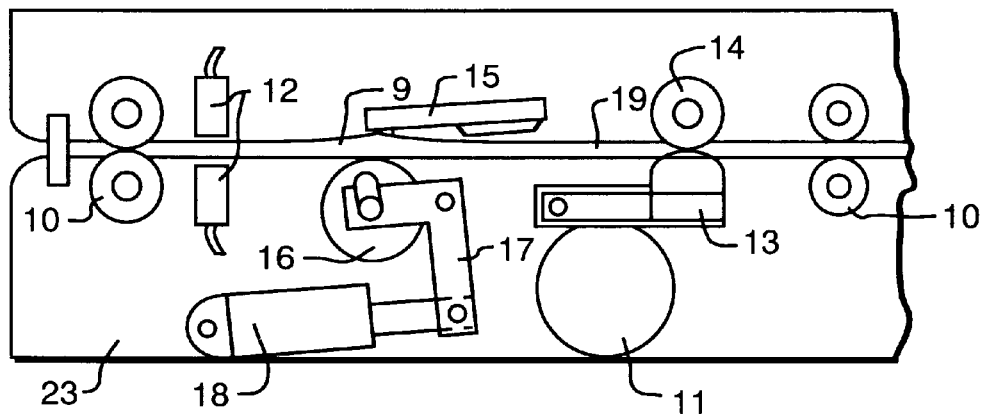
FIG. 2 is a diagrammatic view in longitudinal section through an apparatus according to the invention.
Figure 3:
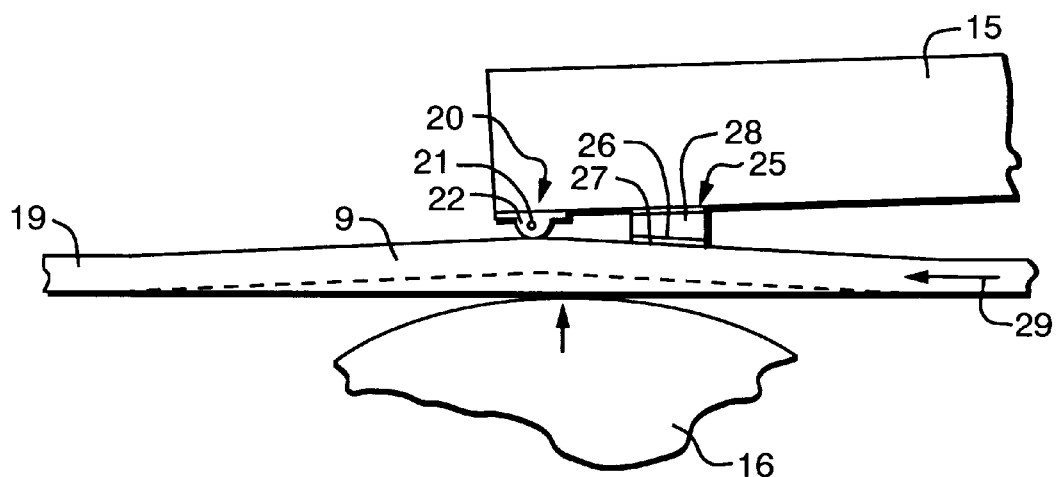
FIG. 3 is a view on an enlarged scale of the thermal erasing and printing region of the apparatus.

A data carrier in card form is shown in FIGS. 1 through 3 and has a card body 1 which includes an electronic module and which in particular comprises two plastic elements which are possibly pre-fabricated and which are pressed together. As can be seen in particular from FIGS. 2 and 3 the card body 1 is surrounded by an edge ridge 2 in which an antenna 30 is arranged, and it is provided at both sides with a surface recess in which an outer layer is arranged. The data carrier has a plurality of visible portions 5, 6, 7 and 8. The portions 5, 6 and 7 are provided on a transparent self-adhesive foil 3 which is detachably arranged on the card body 1. The portion 7 is irreversibly thermally writable, the portion 5 can be printed upon with normal printing ink and the portion 6, for illustrating the owner of the data carrier, is either heat-sensitively coated in order to produce the picture by means of a thermal printer or it is transparent in order to be able to see a photograph 33 disposed therebeneath. Upon issue to the owner, the portions 5, 6 and 7 of the self-adhesive foil 3 are covered with a protective paper 36 which can be pulled off, and only an upper edge strip 4 is glued fast on the card body 1. When a photograph 33 is used, it is fixed in a recess in the card body by means of the transparent self-adhesive foil 3. If the picture is produced by means of a thermal printer, the recess in the card body 1 is filled with an insert 34 (FIG. 2) so that the card body 1 has a flat surface. The insert 34 is preferably arranged in the card body 1 in manufacture and is removed when a photograph 33 is inserted. The insert 34 comprises in particular a siliconised paper which is easily removable from the recess.

Provided in the portion 7 which is not re-writable, upon issue of the data carrier, is a thermotransfer foil 31; the carrier of the irreversibly heat-sensitive layer of the thermotransfer foil 31 at the same time preferably represents the protective paper 36 of the self-adhesive foil 3. The adhesive side of the self-adhesive foil 3 is therefore written by a thermal effect so that the writing is protected by external effects.

It will be appreciated that instead it is also possible to have a direct, irreversibly heat-sensitive coating in the portion 7 which is not re-writable. In both cases, for the writing procedure, it is possible for the self-adhesive foil 3 to be folded rearwardly and for it to be inserted with the protective paper 36 into a thermal printer in order to produce script and/or picture.

Provided in the portion 8 is a reversible heat-sensitive layer 32 which is provided on a foil fixedly joined to the card body 1, or which is disposed directly on the card body. The heat-sensitive layer 32 is writable in a first higher temperature range, for example between 110° C. and 130° C., in the usual manner, by virtue of a thermal effect using a thermal printer. A further application of heat in a second lower temperature range, for example between 80° C. and 100° C., erases the writing so that the region 8 can be freshly written.

An outer layer is preferably also detachably inserted into the surface recess at the second side of the card body 1. At that side it is possible for example to provide a decoration, an advertisement for the purpose of use etc; in addition a second heat-sensitive region and a magnetic strip may be provided here.

The processing procedure (encoding, reading, checking etc) of the data carrier which besides the heat-sensitive zone includes a magnetic strip and/or an electronic module is effected by means of an apparatus as shown in FIGS. 2 and 3.

Extending in a housing 23 is a flat passage which is defined by two lateral U-shaped rails 19 and with which are associated rigidly or elastically mounted rollers 10 driven by a motor 11 and not driven, for transporting a data carrier in card form through the passage. Provided along the passage which defines a straight transport path is a reading-identification device for all known kinds of data carriers in card form, which centrally at each flat side of the passage includes a bar code reader 12, a thermal print head 15 with an oppositely disposed backing roller 16, at least one magnetic read-write head 13 arranged at the outside, with an oppositely disposed backing roller 14, and an IC-reader (not shown).

Between the bar code reader 12 and the magnetic strip reader 13 the passage is provided with an outward bulge portion 9 and the thermal print head 15 is arranged outside the transport path. Data carriers passing through the passage therefore come into contact with the thermal print head 15 only when a data carrier which is to be thermally processed is lifted by the backing roller 16 which is actuable by way of a lever 17 by an electromagnetic unit 18. As shown in broken line in FIG. 4 the data carrier is curved and finally processed. Accordingly curvature of the data carrier occurs only at the respectively required time and to the extent which results in the best possible printing effect. The backing roller 16 is moved to a much greater degree than in the case of known apparatuses as the outward bulge portion 9 is wider than the greatest thickness of the data carriers to be passed through. The contact region of the backing roller 16 is therefore moved from a position outside the transport path substantially through same towards the other side of the transport path and the gap is reduced to the desired width.

As FIG. 3 shows in detail the thermal print head 15 has a writing head 20 by means of which a heat-sensitive layer, that is to say also the reversible, heat-sensitive layer 32, can be written with characters or data. The writing head 20 includes electrical resistance elements 21 which can be actuated in the usual way and which are embedded in a protective glass layer 22. In the transport direction 29, upstream of the writing head 20 a data carrier passes an erasing head 25 which is also provided on the thermal print head 15 and lies in the outward bulge portion 9. The erasing head is heated to a temperature which is about 20° lower than the writing head 20 if writing which is present on the data carrier is to be erased. The erasing head 25 includes a heating wire or a heating foil 26 which is covered by a protective foil 27, is arranged on a resilient cushion 28, and is glued on to the thermal print head 15 at a small spacing relative to the writing head 20. The erasing head 25 can not only erase data to be removed, on the thermoreversible layer 32, but it also causes pre-heating of the heat-sensitive layer 32 for the subsequent writing operation which as a result can take place substantially more quickly. Writing times of 2 msec can be achieved for example so that use of the erasing head for just pre-heating is advantageous, even if no characters are to be erased. In addition contact of the erasing head also causes cleaning of the data carrier so that the writing head 20 which is sensitive by virtue of the protective glass layer 22 is treated gently.

I claim:

1. An apparatus for reading and identifying a data carrier in card form, which can have printing thereon, in particular a travel card, a ski pass or the like, which is provided on at least one side with a heat-sensitive layer or the visually readable representation of data by a thermal effect, with a transport mechanism for moving the data carrier in a flat passage which determines a transport path, a device having a thermal print head for visually readably identifying the data carrier, and a backing roller disposed opposite the thermal print head, characterised in that the thermal print head has a writing head which is operative in a first temperature range for writing the heat-sensitive layer and an erasing head which is operative in a second temperature range for erasing existing characters.

2. An apparatus as set forth in claim 1 characterised in that the first the erasing head and then the writing head are arranged in the transport direction of the data carrier.

3. An apparatus as set forth in claim 1 characterised in that the backing roller is arranged movably towards the thermal print head, wherein the thermal print head is provided in an outward bulge portion of the passage, so far outside the transport path that only passing data carrier do not touch the thermal print head.

4. Apparatus as set forth in claim 2 characterised in that the backing roller is arranged movably towards the thermal print head, wherein the thermal print head is provided in an outward bulge portion of the passage, so far outside the transport path that only passing data carrier do not touch the thermal print head.

* * * * *